United States Patent [19]

Petersen

[11] 3,852,813

[45] Dec. 3, 1974

[54] METHOD AND CIRCUIT FOR RECORDING AUDIO SIGNALS ON MAGNETIC TAPE

[75] Inventor: Christian C. Petersen, Westwood, Mass.

[73] Assignee: Polaroid Corporation, Cambridge, Mass.

[22] Filed: Sept. 11, 1972

[21] Appl. No.: 288,147

Related U.S. Application Data

[63] Continuation of Ser. No. 44,441, June 8, 1970, abandoned.

[52] U.S. Cl. .................................... 360/66, 360/67

[51] Int. Cl. .......................... G11b 5/02, G11b 5/44

[58] Field of Search ............. 179/100.2 R, 100.2 K, 179/100.2 D, 100.2 CF; 340/174.1 G; 178/6.6 A; 360/66, 67, 68

[56] References Cited

UNITED STATES PATENTS

| | | | |
|---|---|---|---|
| 2,813,927 | 11/1957 | Johnson | 178/6.6 A |
| 2,965,722 | 12/1960 | Shorb | 179/100.2 R |
| 3,009,025 | 11/1961 | Takayanagi et al. | 179/100.2 R |
| 3,084,224 | 4/1963 | Sanford | 179/100.2 R |
| 3,262,124 | 7/1966 | Johnson et al. | 179/100.2 R |
| 3,381,098 | 4/1968 | Pezirtzoglou | 179/100.2 R |

FOREIGN PATENTS OR APPLICATIONS

| | | | |
|---|---|---|---|
| 897,044 | 5/1962 | Great Britain | 179/100.2 R |
| 624,638 | 6/1949 | Great Britain | 179/100.2 R |

OTHER PUBLICATIONS

C. D. Mee, The Physics of Magnetic Recording, 1964, Vol. II, pages 73–76.

N. M. Haynes, Transistor Circuits for Magnetic Recording, 1964, pages 115–116, 189–190.

S. W. Athey, Magnetic Tape Recording, 1966, pages 42–47.

Schroeder, R. P., The Effect of AC Bias Waveform on Harmonic Distortion in Magnetic Tape Recording, Jaes, July 1960, p. 1962.

*Primary Examiner*—Alfred H. Eddleman

*Attorney, Agent, or Firm*—Gerald L. Smith

[57] ABSTRACT

A method and circuit for recording an audio signal on magnetic tape wherein a bias signal in the form of a square wave is superimposed upon the audio signal before the latter is fed to a magnetic head for recording to cause the audio signal to operate on a linear portion of the transfer characteristic curve for the tape.

5 Claims, 1 Drawing Figure

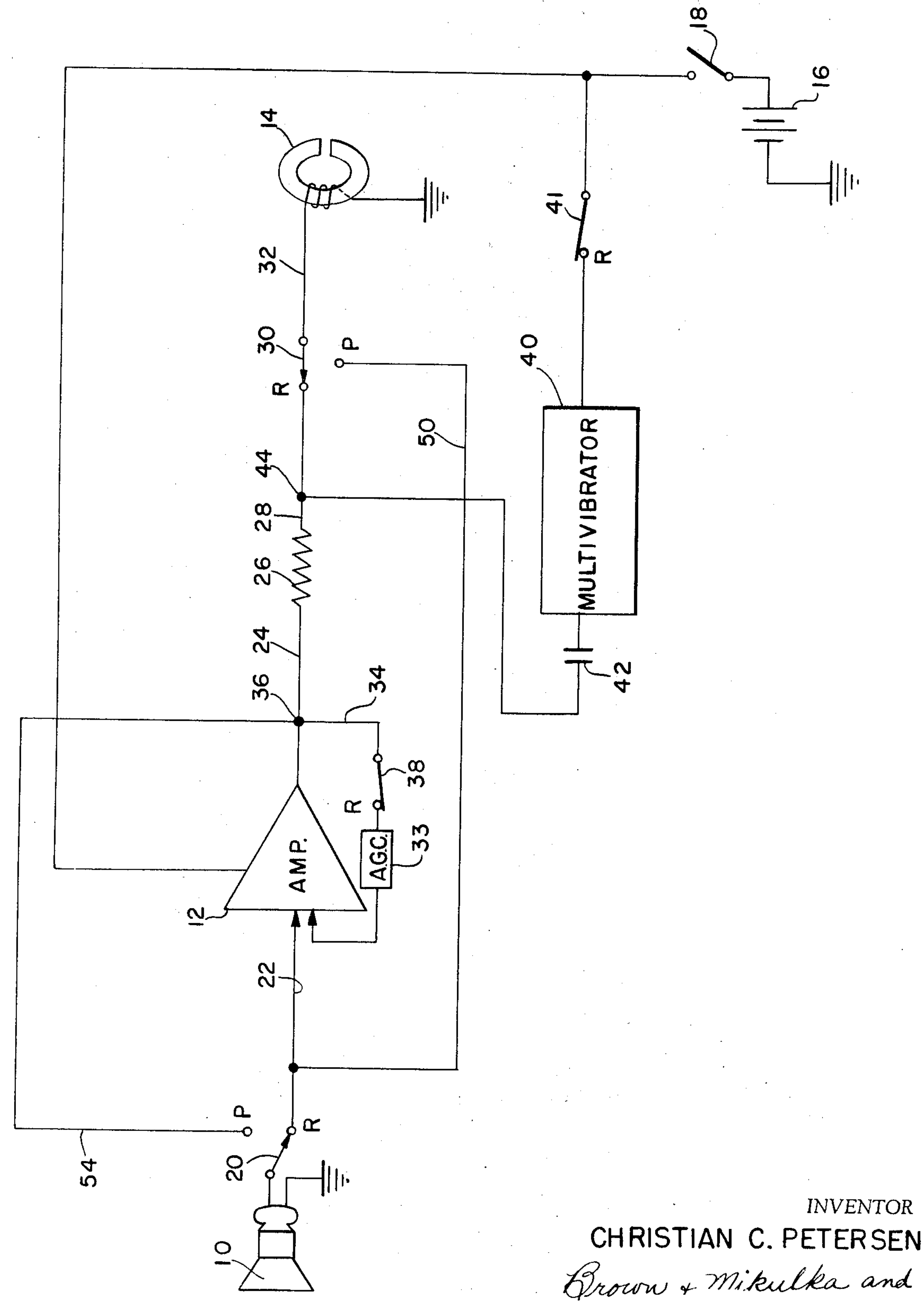
INVENTOR
CHRISTIAN C. PETERSEN
BY Brown + Mikulka and
Richard L. Aitken
ATTORNEYS

METHOD AND CIRCUIT FOR RECORDING AUDIO SIGNALS ON MAGNETIC TAPE

CROSS REFERENCE TO RELATED APPLICATION

This is a continuation of application Ser. No. 44,441, filed June 8, 1970, now abandoned.

BACKGROUND OF THE INVENTION

The present invention relates to magnetic recording, and more particularly, to a method and circuit for recording audio signals on magnetic tape.

In the transfer of electro-magnetic signals onto magnetic recording tape, every magnetic medium exhibits a non-linear characteristic because the magnetization resulting from an exposure is not directly proportional to the strength of the field. This non-linear characteristic, if not corrected, would result in severe distortion of the audible recorded information.

The non-linear characteristic is most often illustrated by means of a "transfer characteristic curve" or a "B-H curve" which is mathematically derived from a family of hysteresis loops. The hysteresis loops and the transfer characteristic curve indicate the degree of tape magnetization which results from an exposure to a magnetic field such as that produced by the record head. The transfer curve also indicates that the non-linearities exist only at the extremely low signal level at the center portion of the curve, and at the very high signal level at the extreme ends of the curve. The remainder of the curve is relatively straight and allows linear and proportional transfer of magnetic signals.

The use of a high frequency bias current applied through the recording head is the standard method of compensating for the non-linearities. The high frequency bias signal is usually generated by an oscillator circuit in the recorder electronic system and is added to the audio signal supplied to the recorder input circuits. By adding the bias signal to the audio signal, a resultant signal is produced which the record head inductively converts from electrical signals into magnetic fields to influence the magnetic tape. The signal with bias essentially bridges the "zero point" and the low signal response portion, and allows the signal changing portions of the input waveform to fall onto the linear segments of the curve, rendering the recorded signal relatively distortion-free.

In conventional techniques, the bias current is usually several orders of magnitude higher than the audio current level, and the shape of the bias signal is conventionally that of a sine wave which requires peak to peak voltage excursions of about 2.8 times the r.m.s. voltage level.

In the use of small portable tape recording equipment, low voltage D.C. power supplies are conventionally employed, and the requisite A.C. signal required to apply voltage of a sufficient magnitude across the recording head to place the resultant signal on a linear portion of the transfer curve necessitates the use of transformers or other large, heavy and bulky devices to achieve the proper voltage levels. Use of such transformers or the like, are prohibitive to relative low manufacturing costs and low package volume density.

SUMMARY OF THE INVENTION

It is therefore an object of the present invention to provide a method and circuit for recording audio signals on magnetic tape which eliminate the use of transformers.

It is a further object of the present invention to provide a method and circuit of the above type in which manufacturing costs and package volume densities are considerably lowered.

It is still a further object of the present invention to provide a method and circuit of the above type which permit an entire circuit of a recording system to be incorporated within an integrated or hybrid circuit.

Towards the fulfillment of the above objects, the method and circuit of the present invention feature the addition of a bias signal in the form of a substantially rectangular waveform which preferably is a square wave, to an audio signal before the latter is fed to a magnetic recording head, to cause the audio signal to perform on a linear portion of the transfer characteristic curve for the recording medium.

BRIEF DESCRIPTION OF THE DRAWING

Reference is now made to the accompanying drawing for a better understanding of the nature and objects of the present invention. The drawing illustrates the best mode presently contemplated for carrying out the objects of the invention and are not to be construed as restrictions or limitations on its scope. The drawing is a circuit diagram illustrating the present invention.

DESCRIPTION OF THE PREFERRED EMBODIMENTS

With reference to the drawing, the basic components of the circuit of the present invention include an audio speaker/microphone unit 10, an audio amplifier 12, and a magnetic record/playback head 14. A low voltage D.C. power supply of the type conventionally required in small portable equipment is shown by the reference numeral 16 and is connected to the amplifier by means of an on-off switch 18.

The speaker/microphone unit 10 is of a conventional design and is adapted to be electrically connected to the input of the audio amplifier 12 by means of a two-position mode switch 20 and an electrical conductor 22. The switch 20 is movable between a "record" mode as indicated by the reference letter R, whereby it makes the above connection, or to a "playback" mode as indicated by the letter P.

The output of the amplifier 12 is connected by means of a conductor 24 to a resistor 26 which, in turn, is adapted to be connected to the head 14 via a conductor 28, a two-position mode switch 30, and a conductor 32. The switch 30 moves between a record mode whereby it is connected between the conductors 28 and 32, and a playback mode.

An automatic gain control 33 is provided for the amplifier 12 in the record mode in a conventional manner by means of a conductor 34 connected to the conductor 24 at a junction 36, and a switch 38. When the switch 38 is closed in the record mode, the output signal of the amplifier is fed back to control the gain of the amplifier, increasing the gain with decreases in the amplitude of the output signal, and decreasing the gain with increases in the amplitude of the output signal.

A free running multivibrator, shown in general by the reference numeral 40, is connected to the power supply 16 via the switch 18 and a switch 41. A capacitor 42 connects the output of the multivibrator 40 to a junction 44 established at the conductor 28. The multivibrator 40 operates in 9 conventional fashion to produce a square wave which is used as a bias signal.

In the playback position of switches 20 and 30, and the open circuit position of the switch 38, the playback signal from the head 14 passes through the switch 30 and a conductor 50 to the input of the amplifier 12. The signal then is amplified by the amplifier 12 and applied to the junction 36, from which it is applied to the speaker/microphone unit 10 via a conductor 54 and the switch 20. The unit 10 converts the applied signal to audio in a conventional manner.

In recording, the switches 20, 30 and 38 are placed in the record mode, and the audio signal produced by the speaker/microphone unit 10 passes through the switch 20 and the conductor 22 into the amplifier 12. The signal is then amplified before passing to the head 14 via the resistor 26 and the switch 30. A square wave is generated by the multivibrator 40 and is superimposed upon the audio signal at the junction 44, and is therefore also applied to the head 14. In the above operation, the resistor 26 sets the level of the audio current and presents a high impedence to passage of the bias signal. The capacitor 42 provides a low impedence to the bias signal and a high impedence to the audio signal which may otherwise pass from the junction 44 to the multivibrator 40. In addition, the capacitor 42 also blocks the direct current level of the multivibrator 40 from the head 14, and therefore makes the bias signal appear as an alternating current signal at the head.

The use of a square wave as a bias signal permits the bias signal to be of a lower voltage than a signal applied by a conventional sine wave. For example, for a given head, if the voltage required to be developed across the head using a sine wave in order to achieve a bias current of 0.3 milliamps is 2.5 volts RMS or 7 volts peak to peak, the circuit of the present invention will reduce this voltage requirement to approximately 5.0 volts peak to peak. The 5.0 volt signal can be generated directly by a conventional solid state multivibrator.

This reduction in voltage as achieved by the present invention results in several advantages. For example, it can eliminate the need for a transformer and permits the circuit of the present invention to be incorporated within an integrated or hybrid system. In addition, far lower manufacturing costs are achieved as well as lower package volumes and densities.

It is understood that several variations can be made in the above without departing from the scope of the present invention For example, the audio signal source is not necessarily derived from a microphone but may be in the form of any other similar type of input source.

Also, the microphone and speaker may be separate units, with the circuit of the present invention being adapted accordingly. Further, a separate recording head and playback head may be utilized. Also any other conventional device may be substituted for the multivibrator to produce a square wave, or at least a waveform comprising a sign wave having odd harmonics added thereto in a proportion to approach a square wave.

Of course, still other variations of the specific construction and arrangement of the method and circuit disclosed above can be made by those skilled in the art without departing from the invention as defined in the appended claims.

What is claimed is:

1. Recording apparatus of a low package volume variety comprising:

speaker-microphone means having a record mode for receiving an audio signal and having an output corresponding thereto; amplifier means connected to said speaker-microphone for amplifying said output; means coupled between the input and output of said amplifier means providing automatic gain control over said amplifier means when said speaker-microphone is in said record mode; free-running multivibrator means having an output generating a bias signal having a repeating, symmetrical, substantially rectangular wave form; a magnetic recording head; circuit means for amplitude summing said bias signal with said amplified output and applying said summated signal to said recording head, said bias signal being selected to cause said audio signal to be recorded linearly.

2. The recording apparatus of claim 1 in which said amplifier means, said automatic gain control means, said free-running multiibrator means and said circuit means are fabricated as an integrated circuit.

3. The recording apparatus of claim 1 further including resistor means within said circuit means intermediate said amplifier means output and the output of said multivibrator means for presenting a high impedance to said bias signal.

4. The recording apparatus of claim 3 further including capacitor means within said circuit means intermediate said multivibrator means output and said recording head for providing a low impedance to said bias signal and a high impedance to the output of said amplifier means.

5. The recording apparatus of claim 1 further including switching means connected with said circuit means and having one orientation for operating said apparatus in said record mode and switchable to another orientation to electrically couple said recording head with the input of said amplifier means and the output of said amplifier means with said speaker-microphone means.

* * * * *